Feb. 21, 1967 M. A. RAPPEPORT 3,305,798

PHASE EQUALIZER CONCATENATED WITH TRANSVERSAL EQUALIZER WHEREIN BOTH ARE AUTOMATICALLY CONTROLLED TO MINIMIZE PULSE DISTORTION AND MINIMIZE BURDEN OF TRANSVERSAL FILTER

Filed Dec. 27, 1963

2 Sheets-Sheet 1

INVENTOR
M. A. RAPPEPORT
BY J. P. Kearns
ATTORNEY 3,305,798
PHASE EQUALIZER CONCATENATED WITH TRANSVERSAL EQUALIZER WHEREIN BOTH ARE AUTOMATICALLY CONTROLLED TO MINIMIZE PULSE DISTORTION AND MINIMIZE BURDEN OF TRANSVERSAL FILTER Michael A. Rappeport, Matawan, N.J., assignor to Bell Telephone Laboratories, Incorporated, New York, N.Y., a corporation of New York Filed Dec. 27, 1963, Ser. No. 334,051
12 Claims. (Cl. 333—18)

This invention relates to transversal equalizers and in particular to arrangements for automatically generating optimum settings therefor.

When a digital pulse is transmitted through a medium having nonuniform attenuation and nonlinear phase its shape is distorted. Intersymbol interference results. The most common approach to the equalization of a practical distorting medium is to design in the frequency domain a compromise filter whose characteristics, on the average, reduce the distortion introduced by the transmission medium to tolerable proportions.

Other approaches to equalization have been made in the time domain. The basic tool then employed is the transversal or time domain filter as disclosed by Blumlein, Kallmann and Percival in United States Patent No. 2,263,376 granted November 18, 1941. The transversal filter utilizes a terminated artificial line serving to effect a time delay in a signal applied to the line. The artificial line is provided with tapping points along its length symmetrically spaced with respect to a main center tap. The several signals appearing at these tapping points are individually adjusted in amplitude and combined in a common summation circuit to form the resultant equalized output signal. The coordination of tapping point spacing and amplitude adjustments produces a predetermined amplitude and phase characteristic.

An important advantage of the transversal filter over frequency domain filters is its flexibility. The amplitude adjustment of the signals from the individual tapping points can be effected by purely resistive elements. This feature permits using the same transversal filter with a variety of transmission media. In connection with data transmission over the switched telephone network where the characteristics of the transmission facility change from call to call the transversal filter has particular utility.

It is accordingly an object of this invention to obtain optimum settings for the amplitude adjustments or corrective multiplying factors of a transversal equalizer automatically.

Recent investigations of the effect of phase distortion in transmission facilities show that a factor other than deviation from linearity produces distortion, particularly where the signal frequency is comparable with the carrier frequency. This additional factor is called phase intercept distortion, related to the phase at zero frequency. In a physical system in which direct-current components are present the phase at zero frequency should ideally be zero degrees or a multiple of $2\pi$ radians, assuming no other forms of distortion are also present. However, in a vestigial sideband system, for example, where the equivalent of zero frequency is the carrier, the phase is no longer restricted to these values, but may occur randomly at any value. The shape of the received pulse may on this account be changed radically, from a pulse of even symmetry to one of odd symmetry, for example.

A solution to the problem of phase intercept distortion is the application of a controllable but constant phase shift across the transmission band of interest. Choice of the proper value of constant phase shift, I have found, contributes to the efficient utilization of the transversal equalizer.

It is therefore a further object of this invention to correct for phase intercept distortion produced in a transmission facility.

According to this invention, a transversal equalizer filter is used to establish the optimum constant phase shift to be applied to a received signal for minimum intersymbol interference and thereby to extend the effect of the transversal equalizer beyond its nominal range, i.e., number of taps provided on the delay line. Further, according to this invention, optimum settings for the attenuating multipliers connected to the taps of the delay line element of a transversal equalizer are obtained automatically.

To obtain optimum phase shift the absolute values of samples of the transmitted pulse just beyond the range of the equalizer delay line are added for a plurality of trial phase shifts cyclically applied at the input of the equalizer. The phase shift giving the minimum sum is set before adjusting the output attenuators. This phase shift is not necessarily zero because of the presence of other distorting elements introduced in transmission and not readily characterized.

Once the optimum phase shift is established the attenuating multipliers are set. The principle is established that the multiplier for a given tap is set to equalize a pulse whose main signal arrives in the corresponding time slot. No multiplier is normally used at the central tap. The multiplier at a tap one time slot preceding the central tap is set to just equalize the interference produced at the central tap by a pulse whose main signal arrives at the image tap one time slot following the central tap. Similarly, taps farther from the center tap are set with respect to the interference at the center tap of a pulse whose main signal is received at the symmetrically located tap.

It is a feature of this invention that the determination of the correct settings of all multipliers can be programmed non-iteratively.

A full appreciation of the principles of this invention will be obtained from a consideration of the following detailed description and the drawing in which.

The basic transversal filter comprises a delay line constructed of either lumped components or sections of lossless coaxial cable, a set of taps symmetrically spaced along the delay line, on either side of a center tap, means for multiplying the signal out of each of these taps by any number between plus one and minus one and a summation network to add the resultant signals. An inverter and a potentiometer are generally used to obtain the multiplication, although a center tapped transformer can be used as an inverter also.

The term "transversal filter" is a misnomer, since the word filter ordinarily implies working in the frequency domain. However, in the transversal filter the energy in the signal is dispersed in time and the resultant components are operated on by the multiplers at successive discrete time intervals rather than continuously.

Figure 3:
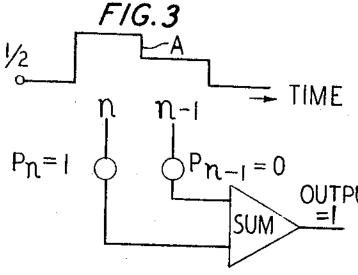
FIGS. 3 and 4 illustrate the principle employed to establish multiplier settings in step-by-step fashion.
Figure 4:
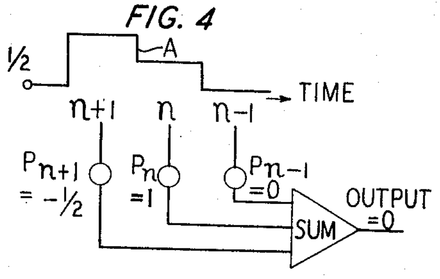

The basic mechanism is illustrated in FIGS. 3 and 4.

The several taps on the delay line are designated symmetrically from the center tap $n$, indicating present time. Taps to the right are designated negatively as $n-1$ and $n-2$, etc., indicating earlier time. Taps to the left are designated $n+1$ and $n+2$, etc., indicating later time. A square pulse of unity amplitude is transmitted. For the purposes of illustration it is assumed that the transmission facility produces an output pulse on two levels, 1 and 1½, spread over two tap spacings.

The object of the transversal equalizer is to achieve a replica of the transmitted pulse at the center tap $n$, while giving a zero output at that same tap for any combination of pulses transmitted in other time slots corresponding to the positions of the leading and lagging taps. Therefore, the summation of all outputs from the delay line at any sampling instant must be either one if there is a main signal present at tap $n$, or zero if there is no main signal at the center tap regardless of preceding and following signals.

The incoming signal wave is moving from left to right. For the two-level distortion signal assumed there is no intersymbol interference lagging the main signal. Thus, when the pulse has completely passed center tap $n$, there are no lagging distortion voltages that must be compensated by feeding back the main pulse from taps $n-1$, $n-2$, and so forth. Therefore, all taps to the right of tap $n$ are confidently set to zero. Since only one pulse shape is being transmitted, the distorted pulse appears the same regardless of the time slot in which it appears. In general, however, both leading and lagging distortion appear and all multipliers are set to nonzero values.

In the example case when the main signal is at tap $n$, as shown in FIG. 3, the desired one output is obtained with the multiplier $P_n$ at tap $n$ set to one and the multiplier $P_{n-1}$ at tap $n-1$ set to zero when the two outputs are summed, as indicated. This is the case when preceding and following data bits are zero. If the succeeding data bit is also a one, as shown in FIG. 4, there is a main component of one at tap $n+1$ and a half component at tap $n$ which, in a summation would give an output greater than unity, thus indicating intersymbol interference. Therefore, tap $n+1$ must be set to cancel this interfering pulse. Tap $n$, already set at one, gives a component of plus one-half. Tap $n+1$ must be set to minus one-half since a full amplitude main signal appears at tap $n+1$. The summed output for the interfering signal only is then zero. With the wanted signal of FIG. 3 and the interfering signal of FIG. 4 present simultaneously the summed output is simply one.

If there were a second succeeding one signal transmitted, its half-amplitude component would appear at tap $n+1$ and be uncompensated. In order to compensate this component a tap $n+2$ preceding tap $n+1$ would be necessary. A unity main component would appear there as well as a negative quarter-amplitude component at tap $n+1$ after multiplication by $P_{n+1}$ set at minus one-half. Therefore, a multiplier $P_{n+2}$ would be set at plus one-quarter for complete compensation.

The process above can be continued indefinitely for as many taps as are provided on the delay line to eliminate interference in as many time slots as desired. In general it is seen that the multiplier settings decrease in absolute value for monotonically decreasing distortion. The process converges to zero for an infinite number of multipliers.

The preceding discussion has concerned itself with delay line equalization only. One feature of this invention deals with phase intercept distortion and permits the equalization of such distortion with a constant phase shift network preceding the delay line. With the aid of this concept the effective range of the delay line can be extended without providing additional taps.

Figure 5:
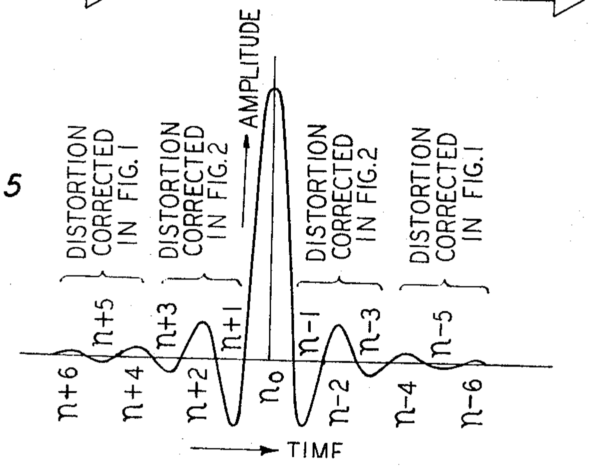
FIG. 5 shows the spectrum of a received pulse before correction in a transversal equalizer.

FIG. 5 illustrates the shape of a typical distorted pulse after transmission over a line introducing delay distortion. Significant distortion components are present over a range of six bit periods preceding and following the main signal. Using the principles of the conventional transversal equalizer a delay line with thirteen taps would generally be required. However, according to my invention the distortion more than three time slots from the main signal can be compensated by controlling the phase shift of the signal entering the delay line. This phase shift is found using a seven-tap delay line.

Figure 1:
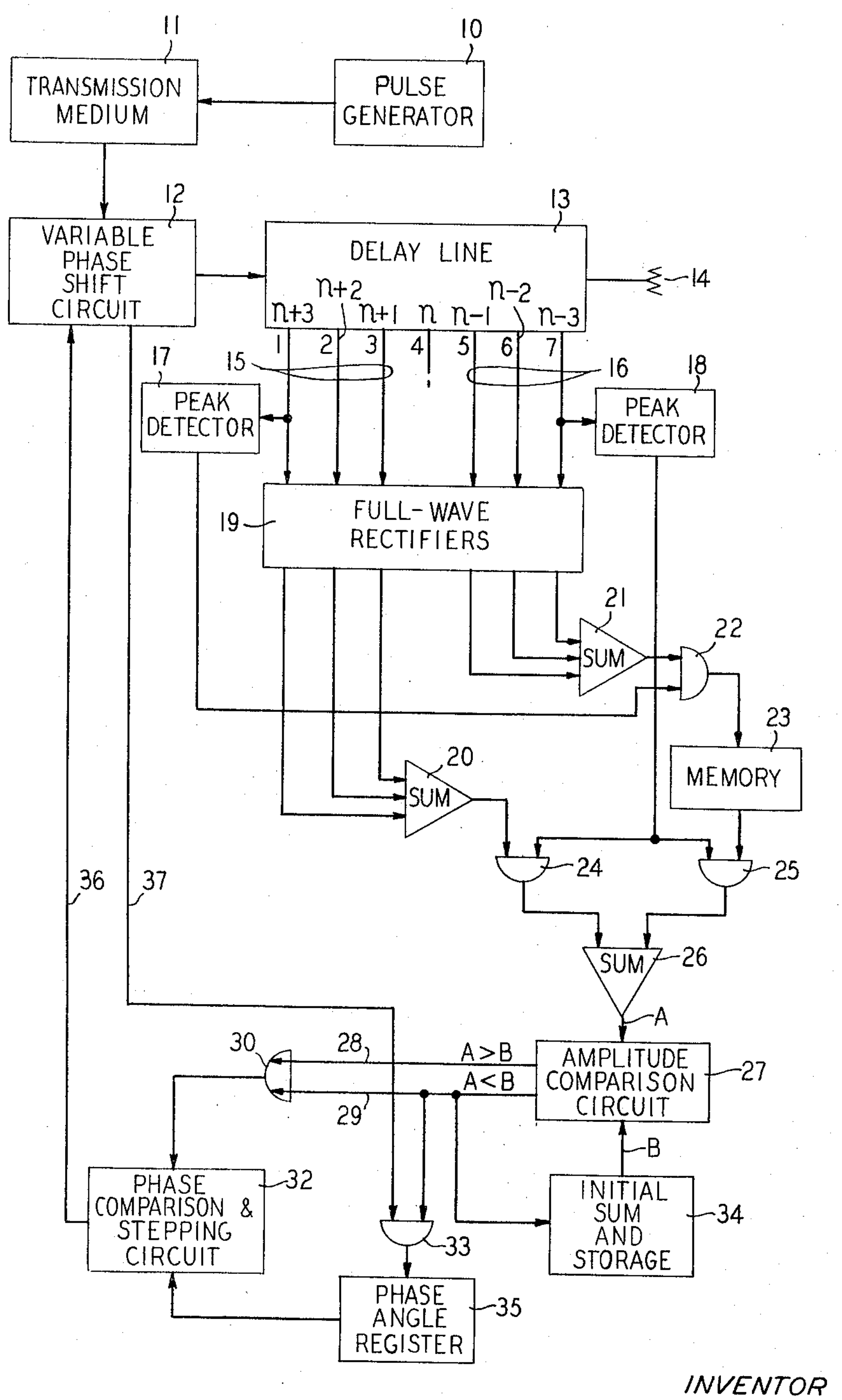
FIG. 1 is a block diagram of a testing arrangement according to this invention for using the transversal equalizer to determine phase shift to be applied to a received signal to achieve minimum phase intercept distortion.

FIG. 1 illustrates a testing arrangement using the conventional delay line to establish the optimum phase shift to cancel distortion beyond the range of the delay line itself. Delay line 13 is shown with seven taps numbered 1 through 7. It is terminated by a resistance 14 of the characteristic impedance to prevent reflections in the line. At the input end a unity square pulse generated in pulse generator 10 after being distorted in transmission medium 11 is applied through a variable all-pass phase-shift circuit 12. The outputs of all taps $n+1$ through $n+3$ (the center tap is not used in the set-up) are normalized by having their absolute values taken without multiplication in full-wave rectifiers 19. The absolute values of the outputs $n+1$ through $n+3$, generally designated together as 15, are connected to a sum circuit 20 and the absolute values of the outputs $n-1$ through $n-3$ generally designated 16, to a further sum circuit 21. At the time the main pulse of the distorted signal reaches tap 1 on the left the distortion components appearing in time slots $n-4$ through $n-6$, as diagrammed at the three rightmost time intervals of FIG. 5, have arrived at taps 16. Peak detector 17 detects this main pulse and produces an enabling pulse for coincidence or AND-gate 22 connected also to the output of sum circuit 21. The instantaneous sum of these distortion components is therefore stored in memory 23 at the output of AND-gate 22.

At the time the main pulse has propagated down the delay line to tap 7 on the right the distortion components appearing in time slots $n+4$ through $n+6$, as diagrammed at the three leftmost time intervals of FIG. 5, have arrived at taps 15. Peak detector 18 detects this main pulse and produces an enabling pulse for coincidence or AND-gates 24 and 25. AND-gate 24 is connected to the output of sum circuit 20 and AND-gate 25, to the output of memory 23. Sum circuit 20 produces the sum of the lagging distortion components normally beyond the range of the delay line and memory 23 has stored the sum of the corresponding leading distortion components. These leading and lagging components are added together in sum circuit 26, and appear as output A.

Output A is applied to an amplitude comparison circuit 27 which has also applied to it the output B of initial sum and storage circuit 34. In the latter the output B is initially set to some arbitrary value based on prior experience with the equalization of transmission media of the type being compensated. Comparison circuit 27 produces one of two outputs depending on whether signal A is greater or less than signal B.

The phase-shift determination scheme is a cyclic one in which a succession of different phases are tried until the optimum is achieved. For this reason phase comparison and stepping circuit 32 is used. Some initial value of phase shift is chosen for phase-shift circuit 12. Whatever this phase, it is registered in register 35 which need be only a dial. The stepping circuit can be set to change the phase in discrete equal steps, say five degrees at a time. Each time a comparison is made in comparison circuit 27 an output appears on one of leads 28 or 29. Buffer or OR-gate 30 communicates the outputs on either of these leads to stepping circuit 32 to change the phase of circuit 12 by way of lead 36. A fresh pulse from generator 10 in conjunction with the new phase setting causes a new output A which is compared with previous output B. The complete selection of phases is tested and the minimum sum is stored in storage 34. The corresponding phase for producing this minimum sum is stored in phase register 35 which is changed every time signal A is smaller than the last signal B. Coincidence gate 33 which also has an input from phase-shift circuit 12 over lead 37 controls the operation of phase register 35. Two possible logic cycles can be used. In one case the phase can be stepped around a complete cycle until the initial phase is reobtained. In the other case the phase shift is stepped through successive phases until the optimum phase shift is repeated. The variable phase shift circuit is set in the optimum phase condition as just determined and the test apparatus is taken down.

Broadband phase-shift apparatus for inclusion in block 12 of FIG. 1 may advantageously be of the active type as disclosed, for example, in E. H. B. Bartelink Patent No. 2,548,855 granted April 17, 1951 and entitled "Phase Shifting Apparatus." The ganged rotating arms of potentiometers 19 and 20 in FIG. 1 of that patent are controllable in a manner readily appreciated by those skilled in the art by phase comparison and stepping circuit 32 of my FIG. 1. Phase angle register 35 is then mechanically coupled to common shaft 23 of the patentee's phase-shifting potentiometers.

Figure 2:
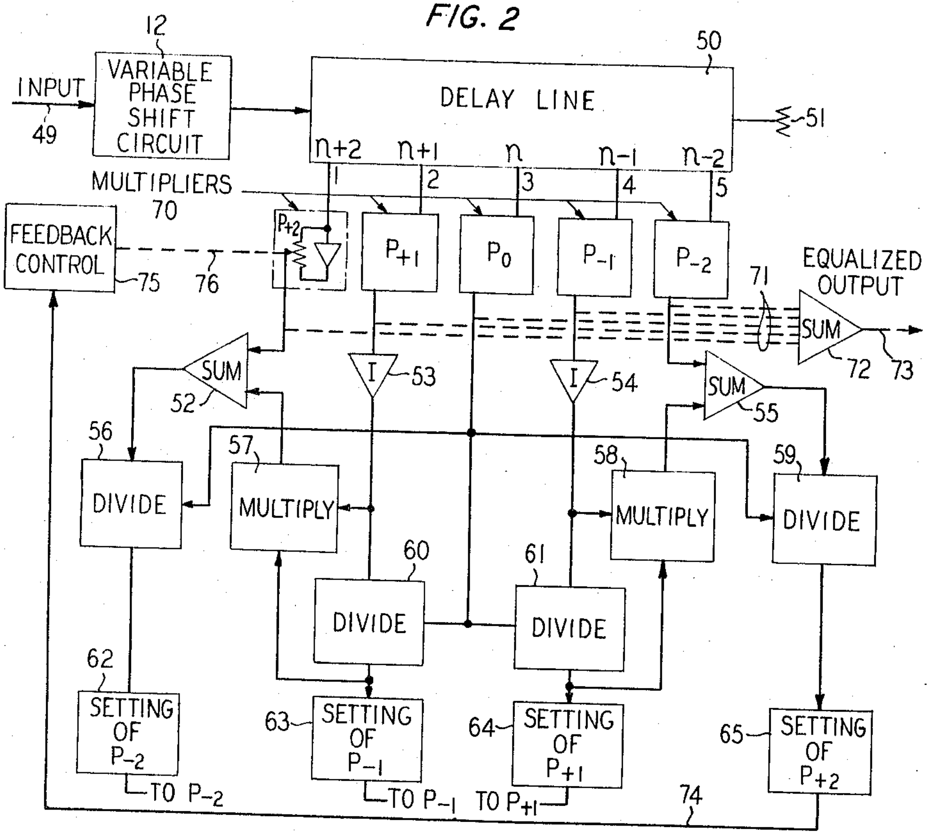
FIG. 2 is a block diagram according to this invention of a representative testing arrangement for simultaneous determination of the correct multiplier settings for a transversal equalizer.

The delay line remains connected to the variable phase-shift circuit 12 and preparations are made to obtain the multiplier settings as shown in FIG. 2. A five-tap delay line is shown in FIG. 2 for simplicity of presentation. A seven-tap delay line or a longer one can as well be used according to the principles of this invention.

In connection with the description of FIGS. 3 and 4 an iterative mode of determining multiplier settings for a tapped delay line transversal equalizer was described. Further analysis shows that a non-iterative determination is also possible. Following the principle that the multiplier in series with a given tap is set to just equalize the interference at the center tap caused by a signal whose main pulse arrives at the image tap symmetrically located with respect to the center tap, all multiplier settings are obtainable from one transmitted pulse.

The center tap is symmetrical with respect to itself and its multiplier $P_0$ is therefore set arbitrarily at unity. Its amplitude is designated $a_0$. The outputs at the other taps when the main pulse arrives at the center tap are designated $a_{-1}$, $a_{+1}$, $a_{-2}$, $a_{+2}$, and so forth, accordingly as they lead or lag the main pulse. The multiplying factors to be determined are correspondingly designated $P_{-1}$, $P_{+1}$, $P_{-2}$, $P_{+2}$, and so forth.

The multiplier for the taps one away from the center are determined by inverting the spectral component at the tap and dividing by the amplitude of the main signal component at the center tap. Thus, $$P_{+1}=\frac{-a_{-1}}{a_0} \qquad (1)$$

$$P_{-1}=\frac{-a_{+1}}{a_0} \qquad (2)$$

The amplitude component two taps removed from the center tap must be multiplied by a factor which will neutralize interference produced at the center tap as well as at the tap between it and the center tap. Thus, the multiplier at a tap two removed from the center tap is set as follows:

$$P_{+2}=\frac{a_{-2}-a_{-1}P_{+1}}{a_0} \qquad (3)$$

$$P_{-2}=\frac{a_{+2}-a_{+1}P_{-1}}{a_0} \qquad (4)$$

Similarly, the multiplier at taps three removed from the center tap neutralizes interference produced at the center tap as well as at all taps between it and the center tap. An inversion is again required.

$$P_{+3}=\frac{a_{-3}-a_{-2}P_{+}1+a_{-1}P_{+2}}{a_0} \qquad (5)$$

$$P_{-3}=\frac{a_{+3}-a_{+2}P_{-1}+a_{+1}P_{-2}}{a_0} \qquad (6)$$

By induction, the multiplier at any tap $m$ removed from the center tap is set as follows:

$$P_m=\frac{a_{-m}-a_{-m+1}P_{+1}+a_{-m+2}P_{+2}\ .\ .\ .\ a_{-m+m+1}P_{m-1}}{a_0} \qquad (7)$$

FIG. 2 implements Equations 3 and 4 simultaneously for a representative five-tap delay line 50, having a resistive termination 51 and intermediate taps numbered 1 through 5. At the output of each tap will be placed multiplier 70 shown in dot-dash outline. Inside the box $P_{+2}$ in series with tap number 1 is shown in inverting amplifier shunted by a potentiometer as the embodiment of a practical multiplier. Each box is understood to contain such a multiplier. All multipliers are initially set at plus one until the ultimate setting is established. The multiplier $P_0$ at the center tap is not adjusted and can be omitted.

In the outputs of taps 2 and 4 one removed from the center tap inverters 53 and 54 are respectively placed. The inverted outputs are applied in turn to respective dividing circuits 60 and 61. Other input circuits for dividers 60 and 61 receive the output of the center tap. The dividers produce an output equal to the quotient of the inverted outputs of the taps adjacent to the center tap and the output of the center tap itself. The outputs of the dividers therefore evaluate Equations 1 and 2. These outputs are registered in blocks 63 and 64. The actual multipliers $P_{-1}$ and $P_{+1}$ can then be set to their operating position either manually or by a simple feedback connection (not shown).

At the same time as the $P_{+1}$ and $P_{-1}$ multiplier settings are being obtained, the $P_{+2}$ and $P_{-2}$ multiplier settings can be had. The inverted outputs of the taps adjacent to the center tap are also directed to one input of respective multiplying circuits 57 and 58. The other inputs to the multiplying circuits are taken from the outputs of respective dividing circuits 60 and 61. The outputs of the multipliers are therefore the products of the settings of the multipliers adjacent to the center tap and the inverted outputs of the taps adjacent to the center tap. The outputs of multiplying circuits 57 and 58 are added in summing circuits 52 and 55 to the outputs of the taps two removed from the center tap. These sums are finally divided by the amplitude of the main signal component at the center tap in dividing circuits 56 and 59. Their outputs are registered in blocks 62 and 65, from the readings of which the respective multipliers $P_{-2}$ and $P_{+2}$ are set either manually or by means of a feedback connection. Such a feedback connection is indicated generally by lead 74 from $P_{+2}$ register 65 through feedback control 75 and mechanical connection 76 to the potentiometer for the $P_{+2}$ multiplier. Feedback control 75 can be of any well known type. Similar connections can be provided for the other multipliers. Equations 3 and 4 are thus evaluated simultaneously with Equations 1 and 2.

By using the structure of FIG. 2 as a guide, one skilled in the art may readily implement Equations 5 and 6 with similar apparatus. An inverter is generally required in series with each oddly spaced tap.

Circuits for multiplying and dividing suitable for use in the appropriate blocks of FIG. 2 are well known in the art. Reference is made for this purpose to Chapter 19 of Waveforms, volume 19, of the Radiation Laboratory Series published by McGraw-Hill Company, Incorporated, (New York, 1949). Reference is also made to Chapter 18 of Waveforms for practical circuits for performing the mathematical function of addition. The register circuits are of the sample and hold type employing storage capacitors.

The successive employment of the testing arrangements of FIGS. 1 and 2 completely sets a transversal equalizer to compensate both for phase intercept distortion and conventional delay or envelope distortion.

After all multipliers are set using the arrangement of FIG. 2, the testing apparatus is taken down and the connections by way of leads 71 are brought to a common summing circuit 72, having an output on lead 73, to effect a working transversal equalizer. Transfer switches, if desired, can be arranged by one skilled in the art between the test apparatus and the working leads 71. Many data messages are prefixed with a start signal. Such a start signal could be employed as a test pulse in the testing arrangement of FIG. 2 to determine the multiplier settings. Transfer of the outputs of the multipliers to a common summing circuit following the start signal then permits the reception of a fully equalized message signal.

While this invention has been set forth in terms of specific embodiments, its principles are general in application to transversal equalizers and are not to be considered as limited to the specific embodiments described.

What is claimed is:

1. Apparatus for correcting phase-distortion imposed upon a communication signal of multiple frequency content by a transmission medium comprising a pulse signal source connected to one end of said transmission medium, a variable phase-shift network connected to the other end of said transmission medium, a tapped delay line driven by said network, means for normalizing the outputs from each tap on said delay line, first means for summing and storing the normalized outputs of all taps to one side of the center tap when the peak pulse amplitude is detected at the remotest tap on the other side of said delay line, second means for summing the normalized outputs of all taps to the other side of the center tap when the peak pulse amplitude is detected at the remotest tap on the one side of said delay line, third means for summing the stored output of said first summing and storing means and the sum output from said second summing means, and means responsive to the output of said third summing means for adjusting said phase-shift network.

2. Apparatus for setting a delay line equalizer comprising a delay line having an odd plurality of evenly spaced taps and a termination at its characteristic impedance, a pulsed signal generator, a transmission medium interconnecting said generator and said delay line causing signals from said generator to be dispersed in time to form a main signal portion with leading and lagging echoes, an adjustable phase-shift circuit in series with said transmission medium, means for taking the absolute value of the outputs from all taps on said delay line, first means for detecting the arrival of the main signal portion of a transmitted pulse at the tap on said delay line nearest the input, means controlled by said first detecting means for summing and storing the absolute values of the outputs of all taps on said delay line beyond the center tap, second means for detecting the arrival of the main signal portion of a transmitted pulse at the remotest tap on said delay line, means controlled by said second detecting means for summing the absolute values of the outputs of all taps on said delay line preceding said center tap and the stored sum of the absolute values of the outputs of all taps on said delay line beyond the center tap, means for comparing the magnitude of the output of the last-mentioned summing means with a sum previously obtained, said comparing means producing first and second outputs depending on whether the last sum exceeds or is less than the previous sum, means for adjusting said phase-shift circuit in discrete steps through a complete circle responsive to the first and second outputs of said comparing means, and means for setting the phase of said phase-shift circuit at the value at which the least sum is obtained from the summing means controlled by said second detecting means.

3. Apparatus for adjusting a transversal equalizer comprising a tapped delay line, a variable phase-shift circuit in series with the input of said delay line, a signal source, a transmission medium interconnecting said signal source and phase-shift circuit, said transmission medium causing a differential delay in components of different frequencies in a signal from said signal source, means for determining the setting of said phase-shift circuit producing the minimum magnitude of the summed outputs taken first from taps lagging a center tap as the main signal portion arrives at the tap nearest the input and second from the taps leading the center tap as the main signal portion arrives at the tap farthest from the input, a plurality of signal multipliers, one in series with each of the taps on said delay line, and means for establishing the settings of said signal multipliers for a minimally distorted output signal from the combined simultaneous outputs of all taps on said delay line.

4. Apparatus according to claim 3 in which said means for establishing the settings of said signal multipliers comprises signal-inverting means connected to each tap in odd counting order from a center tap on said delay line, multiplying means located symmetrically at each tap from said center tap to take the separate products of the output from each signal inverting means at such odd taps and of the direct outputs from each even tap with each corrective factor for each tap between itself and the center tap, first means dividing the inverted outputs from taps adjacent the center tap by the output from the center tap to establish the corrective factors for said adjacent taps, adding means for each tap other than the center and adjacent taps for summing the distortion component at that tap and the products from those of said multiplying means having as inputs the outputs from taps between itself and the center tap taken by counting in descending order toward the center tap and the corrective factors for taps counting in ascending order away from the center tap, second dividing means establishing the corrective factor for each tap having one input connected to the adding means for that tap and another input connected to the center tap, the output of each divider establishing the corrective factor for the tap located symmetrically thereto with respect to the center tap, and means connecting the output of each dividing means to each multiplying means associated with taps outward from the center tap.

5. A correcting circuit comprising a multistage delay means including an input terminal, an output terminal and a plurality of auxiliary terminals intermediate said input and output terminals and a nonreflective termination for said output terminal, an adjustable phase-shift network connected to said input terminal, means for coupling a source of input signals to said phase-shift network,
said input signals being distorted by lagging and leading echoes of a main signal portion,
means for combining the output signals from auxiliary terminals following a center auxiliary terminal when the main signal portion of an input signal reaches the auxiliary terminal nearest said input terminal with the output signals from auxiliary terminals preceding the center auxiliary terminal when the main signal portion of an input signal reaches the auxiliary terminal nearest said output terminal,
means for adjusting said phase-shift network in ordered steps between successive input signals,
means for comparing the successive outputs of said combining means with stored previous outputs therefrom until the minimum such output is determined, and
means for registering the phase-shift at which the minimum output is obtained from said combining means after said phase-shift network has been adjusted through a full cycle of steps.

6. In combination with a multiply tapped delay means including an input terminal and a plurality of auxiliary terminals evenly spaced therealong,
a constant phase-shift network in series with said input terminal adjusted to produce the minimum sum of lagging and leading echoes of a distorted signal applied to said input terminal taken first from the terminals lagging a center terminal when the main signal is at the auxiliary terminal nearest the first terminal and second from the terminals leading the center terminal when the main signal is at the terminal farthest from the input terminal,
a plurality of adjustable attenuating networks one in series with each of said auxiliary terminals, and
means determining the settings of said plurality of attenuating networks at least comprising
means dividing the amplitude of the inverted distortion component appearing at auxiliary terminals adjacent a center terminal by the amplitude of the direct output from the center tap to determine the settings for attenuating networks to be placed in series with the auxiliary terminals adjacent a center terminal,
means multiplying the amplitude of the inverted distortion component appearing at auxiliary terminals adjacent a center terminal by the output of the last-mentioned dividing means,
means adding the output of the last-mentioned multiplying means to the distortion component appearing at auxiliary terminals twice removed from a center tap, and
means dividing the output of said adding means by the direct output from a center terminal to determine the settings for attenuating networks to be placed in series with the auxiliary terminals twice removed from a center terminal.

7. The combination of claim 6 and
feedback means interconnecting said means for determining the settings of said plurality of attenuating networks and said adjustable attenuating networks to effect automatic control thereof.

8. The combination of claim 6,
a common summing circuit, and
means connecting said plurality of attenuating networks to said common summing circuit after the settings of said attenuating networks have been determined,
the output of said summing circuit constituting an undistorted replica of a distorted signal applied to the input of said multiply tapped delay means.

9. In a delay line transversal equalizer having an input terminal, an output terminal and an odd plurality of evenly spaced taps intermediate said input and output terminals,
means for determining from a single transmitted test pulse the settings for a plurality of corrective multipliers to be connected to said taps whereby the corrected sum of the output from all taps compensates for distortion imparted to a pulse transmitted through a given transmission medium terminating at said input terminal comprising
means at each tap but the center tap taking the product of the distortion component at that tap and the corrective factor for each tap between itself and the center tap,
means at each tap but the center tap adding the distortion component at that tap to the products from those product-taking means located at taps intermediate the given tap and the center tap which include only the products of the distortion components from taps taken in descending order with corrective factors for taps taken in ascending order,
means connected to each adding means dividing the output thereof by the main signal component at the center tap to produce corrective factors to be set in the corrective multipliers to be placed in series with the taps symmetrically located with respect to the center tap from a given tap,
signal inverting means in series with each tap oddly spaced from the center tap, and
means connecting each dividing means to one product-taking means at each tap located between itself and the given tap.

10. Apparatus for establishing the appropriate multiplying factors for a multiply tapped delay line equalizer comprising
a non-reflectively terminated lossless delay line,
a center tap on said delay line,
a first pair of taps symmetrically located with respect to said center tap along said delay line and spaced therefrom by a predetermined delay time,
a second pair of taps symmetrically located with respect to said center tap along said delay line and spaced therefrom by twice the predetermined delay time,
means establishing a representative test signal having distortion components corresponding to those imparted by the traversal of an imperfect transmission medium,
the main signal portion of said test signal being at said center tap at the instant when the multiplying factors are being determined,
first signal-inverting means in series with each of said first pair of taps having as an output the reciprocal of the distortion component at each of said first pair of taps,
first dividing means connected to said signal-inverting means,
means connecting said center tap to said dividing means,
the output of said first dividing means establishing the multiplying factor for a multiplier to be placed in series with the image tap of said first pair of taps,
summing means connected to each of said second pair of taps,
means multiplying the output of each signal-inverting means by the output of the associated dividing means,
means connecting each of said multiplying means to the corresponding summing means, and
second dividing means connected to each of said summing means and to said center tap,
the output of said second dividing means establishing the multiplying factor for a multiplier to be placed in series with the image tap of said second pair of taps.

11. The apparatus of claim 10 in which a third pair of taps is located along said delay line symmetrically spaced from said center tap by three times said predetermined delay time, a second signal-inverting means is in series with each of said third pair of taps, second and third multiplying means are connected to said first signal-inverting means and to each of said second pair of taps, respectively, the output of said second dividing means is connected to said second multiplying means, the output of said first dividing means is connected to said third multiplying means, the outputs of said second and third multiplying means being the products of the distortion components at said first and second pairs of taps and the multiplying factors for said second and first pairs of taps, respectively, adding means is connected to take the sum of the distortion component at each of said third pair of taps and the output of the corresponding second and third multiplying means, and third dividing means is connected to each of said adding means and to said center tap, the outputs of said third dividing means establishing the multiplying factor for a multiplier to be placed in series with the image tap of said third pair of taps.

12. The apparatus of claim 10 in which a constant phase-shift network is connected in series with said delay line, and means is provided for determining the optimum adjustment for said phase-shift network at which the sum of outputs taken first from taps succeeding said center tap when the main signal portion is at the tap nearest the input of said delay line and second from taps preceding said center tap when the main signal portion is at the tap farthest from the input of said delay line is minimum.

References Cited by the Examiner

UNITED STATES PATENTS

| | | |
|---|---|---|
| 2,976,516 | 3/1961 | Taber. |
| 3,204,180 | 8/1965 | Bray et al. |

HERMAN KARL SAALBACH, *Primary Examiner.*

P. L. GENSLER, *Assistant Examiner.*